No. 644,702. Patented Mar. 6, 1900.
C. E. BROOKS.
VARIABLE SPEED GEARING.
(Application filed June 12, 1899.)

(No Model.)

ATTEST
A. J. McCauley.
M. F. Smith.

INVENTOR:—
Charles E. Brooks.
By Higdon Longan, ATTY'S.

UNITED STATES PATENT OFFICE.

CHARLES E. BROOKS, OF ST. LOUIS, MISSOURI.

VARIABLE-SPEED GEARING.

SPECIFICATION forming part of Letters Patent No. 644,702, dated March 6, 1900.

Application filed June 12, 1899. Serial No. 720,269. (No model.)

*To all whom it may concern:*

Be it known that I, CHARLES E. BROOKS, of the city of St. Louis, State of Missouri, have invented certain new and useful Improvements in Variable-Speed Gearing, of which the following is a full, clear, and exact description, reference being had to the accompanying drawings, forming a part hereof.

My invention relates to variable-speed gearing; and it consists of the novel construction, combination, and arrangement of parts hereinafter described and claimed.

Figure 1:
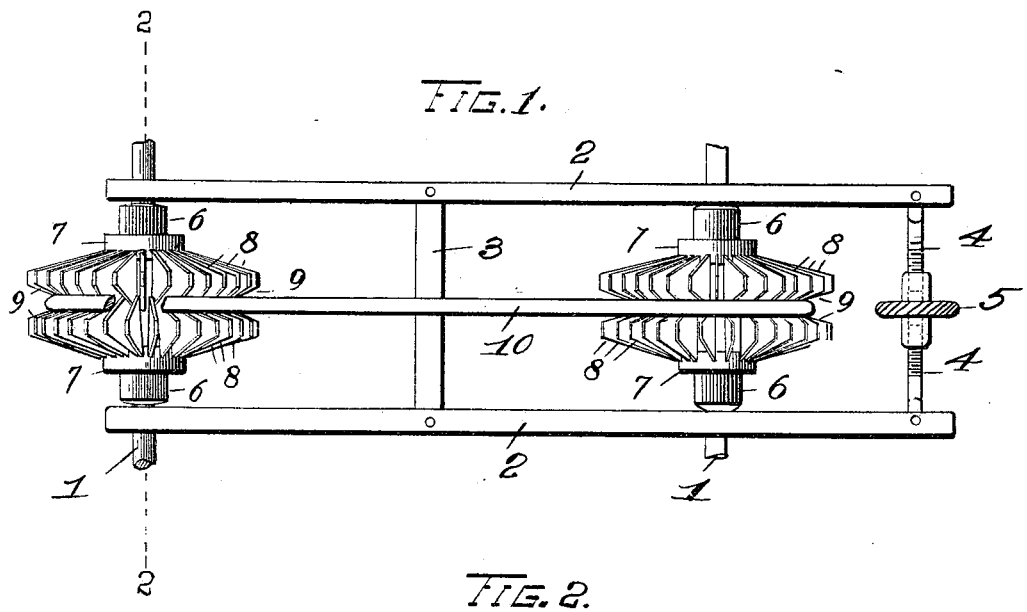
Figure 2:
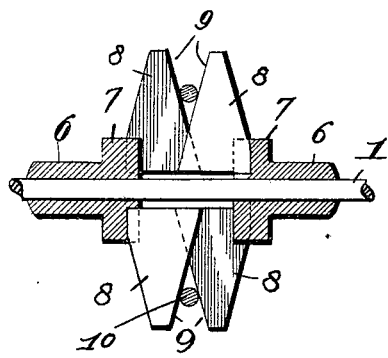
Figure 3:
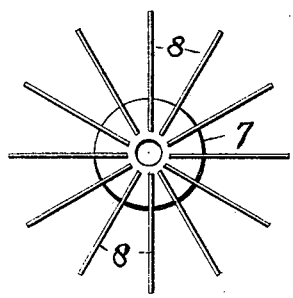

Figure 1 is a plan view of my improved variable-speed gearing. Fig. 2 is a transverse sectional view taken approximately on the line 2 2 of Fig. 1. Fig. 3 is a side elevation of one of the wheels of which I make use in carrying out my invention.

In the construction of the gearing as shown the shafts 1 are rotatably arranged in a pair of side frames 2, which side frames are pivotally arranged upon the ends of the cross-bar 3, and said frames are extended beyond one of the shafts 1, which extended ends are connected by a pair of screw-threaded rods 4, the same entering the opposite ends of an ordinary turnbuckle 5. Upon each shaft 1 between the side frames 2 is located a pair of wheels made use of in my improved gearing, each one of said wheels comprising a sleeve 6, arranged to slide upon the shaft 1, and integral with one end of each sleeve is a collar 7, which collar carries a plurality of radially-arranged blades or arms 8, set edgewise in said collar, the same projecting laterally from said collar 7 and being provided with the inclined or slightly-curved outer faces 9. As heretofore stated, a pair of these wheels is arranged upon each shaft 1, and when in proper position upon said shafts the contiguous edges of the radially-arranged blades or arms of one wheel intermesh or occupy positions between the arms or blades of the mating wheel. Consequently when said wheels are in position upon the shafts each pair will form practically a single wheel having a V-shaped groove in its periphery, said groove being formed by the oppositely-inclined outer edges 9 of the blades or arms 8. Passing around the pairs of wheels so constructed and located in the V-shaped groove is an endless rope or cable 10, such as is generally used in the transmission of power.

When the turnbuckle 5 is manipulated so that the side frames 2 are perfectly parallel, each pair of the wheels will occupy the same relative position, and therefore when one of the shafts 1 is rotated the opposite shaft will rotate at the same speed as does the driven shaft; but should the turnbuckle 5 be manipulated so that the side frames 2 swing upon the ends of the cross-bar 3, thus throwing said side frames out of parallel alinement, then the speed of the counter-shaft will be either increased or decreased, according to the direction in which the ends of the side frames have been moving. This result is accomplished for the reason that the shafts 1 are located equidistant from the cross-bar 3, and when the side frames 2 are slightly moved upon their pivot-points upon the ends of said cross-bar one pair of the wheels will be moved nearer together, while the opposite pair of wheels will separate a corresponding distance by reason of the pull of the rope. Thus the diameter of the groove between the pair of wheels that have been moved nearer one another is increased, while the diameter of the groove between the pair of wheels that have separated will be descreased, and if the wheels upon the driven shaft are moved nearer one another then the speed of the counter-shaft will be increased, owing to the fact that the belt is running from a groove of large diameter into a groove of smaller diameter.

By the use of a variable-speed gearing of my improved construction the speed of a shaft can be increased or decreased while the device is in operation, and the exact speed at which it is desired to run a shaft can be very easily and quickly obtained. The rope or cable will always remain tight, owing to the fact that the diameters of the wheels over which said rope or cable passes increase and decrease in size proportionately, and said gearing is very simple, easily manipulated, and can be utilized in a variety of machines. The arrangement of the side frames and the turnbuckle for moving said side frames upon their pivots is not essential, as the sleeves carrying the plurality of blades can be simultaneously and proportionately shifted upon the shafts in a various number of ways.

I claim—

The improved variable-speed gear, comprising a pair of shafts, a pair of wheels mounted upon each shaft, each of said wheels comprising a sleeve 6 arranged to slide upon its shaft, a collar 7 integral with one end of each sleeve, a plurality of radial blades 8 set edgewise in each collar and projecting laterally therefrom, whereby the contiguous edges of said blades of each pair of wheels intermesh, and suitable means for moving said wheels upon said shafts, substantially as specified.

In testimony whereof I affix my signature in presence of two witnesses.

CHARLES E. BROOKS.

Witnesses:
EDWARD E. LONGAN,
M. P. SMITH.